United States Patent Office 3,533,776
Patented Oct. 13, 1970

3,533,776
PRILLING PROCESS FOR THE MANUFACTURE OF GRANULES OF MATERIALS ADAPTED FOR FERTILIZERS OR OTHER USES
Roy Victor Coates, Felixstowe, Murray Francis Curtis and Gordon John Harris, Ipswich, and Peter Sidney Smith, Felixstowe, England, assignors to Fisons Fertilizers Limited, Felixstowe, Suffolk, England
No Drawing. Filed Nov. 29, 1966, Ser. No. 597,536
Claims priority, application Great Britain, Dec. 8, 1965, 52,020/65
Int. Cl. C05b *19/00;* C05c *1/00*
U.S. Cl. 71—28          7 Claims

ABSTRACT OF THE DISCLOSURE

Improved process for producing non-caking, mechanically stable granules of a material such as ammonium nitrate or ammonium phosphate, etc., by causing droplets of the aforementioned type materials in molten form to fall through a cooling tower and while in a fluid state passing the droplets through a dust-bearing gas zone within the tower, said dust-bearing zone containing dust particles such as magnesium oxide and various clay materials in a specified concentration, thereby contacting the surface of the droplets with the dust particles, and finally collecting the molten droplets modified with the dust particles in a fluidized bed at the base of the tower. The dust bearing zone in the present process is formed by a flow of air under appropriate conditions through a bed of the dust particles, thereby maintaining the bed in a fluidized state.

---

The present invention relates to an improved process for the manufacture of non-caking and/or mechanically stable granules. By the term "mechanically stable granules" is meant granules which are not fragile and are capable of being handled in a conventional manner without breaking.

Granular materials, for example fertilizers, ammonium nitrate, etc., have been made for a considerable time, and numerous methods have been proposed to ensure, inter alia, that the granules do not coalesce or cake on storage, or possess other advantageous properties. The methods hitherto proposed have involved either the treatment of the formed granule with a coating or dusting agent to modify the surface characteristics of the granule or the incorporation of a modifying agent with the components of the product before granulation.

It has now been found that treatment of granular materials to minimize caking etc., is most conveniently effected by contacting the granules while in a fluid state, e.g. before solidification, with the treating agent in dust form. Where this is done, the treating agent is not merely attached to the surface of the granule but is at least partly absorbed into the granule, giving the advantages of the two methods hitherto employed.

Accordingly the present invention is for a process for obtaining modified granules which comprises treating the granules while in a fluid state with the desired treating agent in the form of dust.

In its simplest and preferred embodiment, the invention comprises treating the granules with the dust during manufacture.

For convenience the invention is described in the first place with reference to the simplest embodiment. In accordance with the simplest embodiment of the invention, the fluid drops which will form the granules are contacted with the treating material in dust form prior to solidification forming the granular products. The granulation of molten materials by allowing droplets of the molten material to fall through a cooling tower has been well known for centuries; this process is now commonly referred to as prilling. According to the present invention, a dust stream is introduced into the cooling or prilling tower so that the droplets, while still fluid, pass through a dust bearing gas zone. The dust bearing gas zone may extend over the whole of the prilling tower or may occupy only a part of the prilling tower. The dust bearing gas zone may be static, providing that the dust loading is maintained, but more usually the dust bearing gas zone will have a gas flow, which usually will be countercurrent to the droplets flow. The optimum rate of flow of the gas will depend on a number of factors, for example the characteristics of the dust and the size of the droplets. Generally however, the rate of flow of the gas is of the order of 1.5–3 feet/second. The content of dust in the gas may also vary for similar reasons, and generally should be of the order of 0.01–0.25 pound per cubic foot.

The particle size of the dust may also vary over a wide range, but generally is as small as possible, for example less than 100 microns.

The materials which may be treated in accordance with the present invention may be of many types. According to a preferred embodiment of the invention the material is a fertilizer such as ammonium nitrate, ammonium sulphate nitrate, ammonium phosphate, mixtures of ammonium nitrate with for example mono- or di-ammonium phosphate, or potassium chloride with or without other materials, potassium phosphate, potassium nitrate, sodium nitrate, urea or mixtures of any of these materials together or with other materials. The material may be other than a fertilizer for example ammonium nitrate for non-fertilizer uses, alkali metal hydroxides and other fusible chemicals.

The dust may be any material which is useful for incorporating in or coating the granular material.

In the case of ammonium nitrate or ammonium nitrate containing granules for fertilizer or non-fertilizer uses, it is known that the incorporation of various metal salts and compounds confers stability, resistance to thermal cycling, anti-caking and other advantageous properties. Magnesium salts and compounds such as magnesium oxide and magnesium carbonate are especially suitable; other materials such as aluminum salts and compounds exemplified by aluminum oxide may also be used. These, and other materials, may readily be absorbed on granules employing the process of the present invention.

According to a specially preferred embodiment of the invention droplets of molten ammonium nitrate or an ammonium nitrate containing material are contacted while in the fluid state with a treating agent in dust form suitably comprising a magnesium salt or compound or a clay or talc containing magnesium. By carrying out the pocess of hte present invention, the treating agent at least partly penetrates into the droplet or granule; in some cases examination of the granular product shows that magnesium compounds applied in this way are "dissolved" or dispersed through the granule.

Specially suitable dusts which may be mentioned include magnesium oxide (pure or commercial), magnesium carbonate (pure or commercial), attapulgite, aluminum oxide, talc, calcium montmorillonite and mixtures of any of these together or with other materials.

It is clearly simplest to effect the treatment according to the present invention during manufacture of the granules. If desired, however, the treatment may be applied to formed granules where these are brought to a fluid state prior to treatment. This may be effected for example by dropping the granules through a tower the first part of which is a heated zone where the granules at least partly liquify and are then contacted with the dust-bearing gas.

The following examples are given to illustrate the present invention. In these examples, the tests were carried out as follows:

Air was passed into the inverted conical base of a column 5 feet high containing a 2 feet depth of bed of the treatment material indicated in the table below in dust form. Maximum particle size was 75 microns. The air flow maintained the bed at the base of the column in a fluidized state but also with transport of the dust in the air stream. The air flow up the column was as indicated in the table below, the dust material content in the air flowing up the column was approximately 0.05 to 0.1 pound per cubic foot.

EXAMPLE 1

Molten 99–100% anhydrous ammonium nitrate at 180° C. was released at a rate of 5–10 drops per second from a nozzle $\frac{1}{32}$ inch diameter at the top of the column and the formed granules were run off from the base of the column.

The stability of the product was estimated by determining the number of thermal cycles between 0 and 70° C. before breakdown of the prills occurred, and this figure is given in the table below. This is a measure of the resistance to thermal cycling of the product.

| Treatment material | Bulk density of dust, g./cc. | Air flow, ft./sec. | Product moisture content, percent | No. of cycles before breakdown of prills |
|---|---|---|---|---|
| Magnesium oxide (commercial) | 0.85 | 2.1 | 0.69 | 144 |
| Magnesium oxide (pure) | 0.08 | 1.4 | 1.11 | 144 |
| Attapulgite | 0.28 | 2.1 | 0.54 | 180 |

Solely by way of comparison, the process was repeated wherein the ammonium nitrate was prilled using a standard air prilling tower. The stability of the product was determined as above, and this was found to break down after 5 thermal cycles between 0 and 70° C.

EXAMPLE 2

Molten ammonium nitrate-containing material was fed from the top of the column through a multiplicity of nozzles at a temperature between 169° and 180° C. It was found that substantially spherical prills (granules) were obtained with flow rates over a wide range from single drops to a liquid stream.

In the following table the pick up of fuller's earth by molten prills is given. The number of items the prills can be cycled through a temperature of 32° without breaking down is also compared (R).

| Composition of molten material percent | Pick-up of fuller's earth, percent | R |
|---|---|---|
| 99.7, $NH_4NO_3$ / 0.3, $H_2O$ | 15 | 60 |
| 79.4, $NH_4NO_3$ / 20.3, $NH_4H_2PO_4$ / 0.3, $H_2O$ | 7 | >200 |

The particle size range of the dust was 100% less than 100 microns. The main constituent of the fuller's earth was montmorillonite (about 70–95% by weight).

EXAMPLE 3

Molten urea at 134° C. was released at a rate of 5–10 drops per second from a nozzle $\frac{1}{32}$ inch diameter at the top of the column into a dust-bearing gas zone containing Norwegian talc. The droplets of molten urea picked up 12.1% of their weight of the talc and formed granules having non-caking properties.

We claim:
1. A process for obtaining modified non-caking or mechanically stable granules of a material selected from the group consisting of ammonium nitrate, ammonium sulphate nitrate, ammonium phosphate, potassium chloride, potassium phosphate, potassium nitrate, sodium nitrate, urea and mixtures thereof, wherein the granules are formed by causing droplets of at least one of the aforementioned materials in molten form to fall through a cooling tower and while in a fluid state, passing the droplets through a dust-bearing gas zone above a fluidized bed within the tower, thereby contacting the surface of the droplets with the dust particles in said zone, said dust particles being selected from the group consisting of magnesium carbonate, magnesium oxide, aluminum oxide and a clay or talc containing magnesium, and said dust-bearing zone containing 0.01 to 0.25 lb. per cubic ft. of dust having a particle size of less than 100 microns and being formed by an air flow of 1.5–3 ft. per second through a fluidized bed of the said dust particles at the base of the column, said air flow being sufficient to maintain the bed in a fluidized state.

2. A process as claimed in claim 1 wherein the dust bearing gas, forming the dust-bearing gas zone, flows countercurrent to the flow of the droplets.

3. A process as claimed in claim 1 wherein the molten material is ammonium nitrate.

4. A process according to claim 1 wherein the molten material is ammonium sulphate nitrate.

5. A process according to claim 1 wherein the dust particles are magnesium oxide.

6. A process acording to claim 1 wherein the dust particles are a clay or talc containing magnesium.

7. A process according to claim 1 wherein the dust particle is aluminum oxide.

References Cited

UNITED STATES PATENTS

| 2,382,298 | 8/1945 | Datin. |
| 2,991,170 | 7/1961 | Szepesi et al. |
| 3,048,887 | 8/1962 | Weiland. |
| 3,186,828 | 6/1965 | Baarson et al. |
| 3,231,413 | 1/1966 | Berquin. |
| 3,379,496 | 4/1968 | Russo. |
| 3,398,191 | 8/1968 | Thompson et al. |
| 3,085,870 | 4/1963 | Bradford et al. ____ 71—28 XR |

FOREIGN PATENTS

| 243,192 | 11/1925 | Great Britain. |

REUBEN FRIEDMAN, Primary Examiner

B. H. LEVENSON, Assistant Examiner

U.S. Cl. X.R.

71—34, 53, 60, 64; 264—7